Sept. 28, 1954 W. F. CRAWFORD 2,690,004
METHOD OF MANUFACTURING JOINTS
Filed Sept. 14, 1949

INVENTOR
William F. Crawford

By Strauch + Hoffman
Attorneys

Patented Sept. 28, 1954

2,690,004

UNITED STATES PATENT OFFICE 2,690,004

METHOD OF MANUFACTURING JOINTS

William F. Crawford, Chicago, Ill., assignor to Edward Valves, Inc., East Chicago, Ind., a corporation of Indiana Application September 14, 1949, Serial No. 115,703

2 Claims. (Cl. 29—423)

This invention relates to the integral casting of relatively movable elements, and in particular to the casting of a valve disk on a relatively movable stem, or similar connection.

In fluid control valves of the type wherein a movable valve element such as a disk or gate etc., is moved into or away from engagement with a stationary seat by means of a rotatable valve stem, it has been conventional practice to provide some sort of socket in the disk or gate etc., to receive the valve stem, and to secure the two elements together for relative rotation by means of threaded, slotted or keyed connections or the like. The essential requirement is that the disk or gate or the like be freely rotatable with respect to the stem and yet be positively secured thereto for axial movement therewith. Threaded connections sometimes become disengaged, or galled after use and the slotted or keyed connections prove costly to manufacture and are structurally weak from machining. I have provided a novel and improved assembly and method of assembling the stem and disk or gate which satisfies all requirements and which is less costly than previously known assemblies.

In accordance with my invention, the lower end portion of the valve stem, which is normally seated in a socket in the valve disk or gate, etc., is provided, as by machining, with a peripheral groove or indentation which is smoothly faired or so contoured as to have no radial face. The extreme end portion is preferably formed in such manner as to provide a thrust surface for pushing against the bottom of the socket in the disk or the like, although the aforesaid peripheral groove may provide the axial thrust against the seat if desired. After the end portion of the stem is properly shaped, it is dipped into a slurry of finely divided material which will adhere to the stem and which when dried or baked thereon will form a frangible refractory coating. After a proper thickness of coating is formed on the stem it is dried or baked and this coated part is placed in position in a mold cavity having the desired shape of disk or the like. The disk is poured while the coated stem acts as a core. After cooling, the integral stem and disk are removed from the mold, and the stem is worked, as by rotating and vibrating, to break up and loosen and remove the frangible coating. A clearance space is thus provided, allowing relative rotation of the disk and stem, and the indentation on the stem, with the mating projection in the bore of the disk, holds the elements against disassembly.

The primary object of this invention is to produce a new and improved self-seating cast valve disk or gate or the like, which will seat securely without danger of galling or binding because of a predetermined clearance between the valve stem and disk which allows the stem to be finally tightened against its seat without turning the valve disk.

Another object of this invention is to provide a novel and improved valve disk and stem assembly.

A further object of this invention relates to the providing of a desired clearance between two elements by means of a finely divided refractory material which when used with a weak binder will crumple easily.

Another object is to provide a swivel jointed disk or the like which is cast on a stem, eliminating one or more parts or manufacturing operations required by conventional construction.

A still further object is to provide an improved method of making a valve disk and stem assembly wherein the disk is molded on a coated valve stem having a rotating relative motion obtained by a predetermined clearance between the valve disk and stem.

Other objects will be apparent as the description proceeds in connection with the accompanying drawings, wherein.

Figure 1:
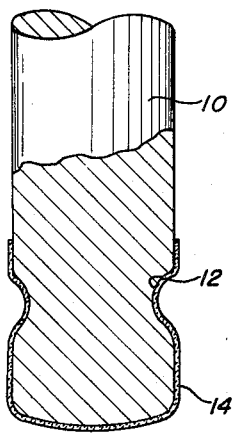
Figure 1 is a side elevation, partly in section, of a valve stem coated with the refractory material prior to the molding process.

In the drawings, 10 is a valve stem or rod which is movable axially, and which may also rotate during its axial movement, depending upon the structure of the means for moving it. Adjacent its bottom, the stem has a peripheral groove 12 of any suitable configuration for the intended purpose. The essential requirement of the groove is that it be sufficiently deep so that the disk or the like which is cast thereon in the manner to be described, cannot slip off or be disengaged from the bottom end of the stem, and it is preferably contoured so that there are no sharp corners or radial faces which would make it difficult to remove the sintered coating after the casting operation.

Figure 3:
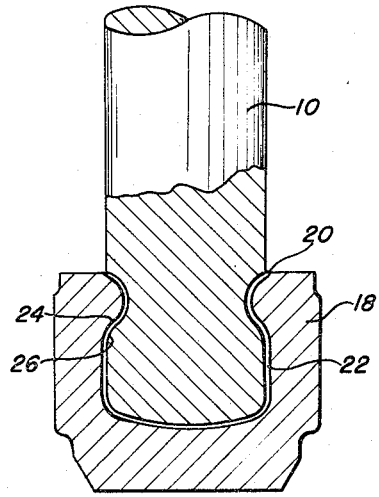
Figure 3 is a side elevation, partly in section, showing the valve disk molded to the stem and the refractory material removed.
Figure 4:
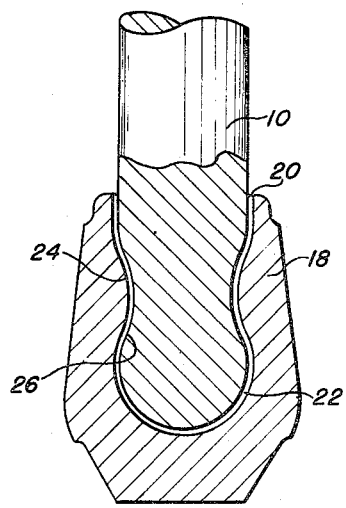
Figure 4 is a side elevation, partly in section showing different mating contours of valve and stem.

The next step is to dip the bottom end of the stem into a suitable slurry comprised of a mixture of finely divided refractory material, a binder, and a liquid which furnishes temporary liquidity to the mixture. A principal requirement of the refractory is that it be of small diameter particles wherein more of the particles are of such size as to approach the dimension of the final clearance between the stem and disk assembly. The binder should be one which has adequate strength so that after being set by drying or baking it will bind the refractory onto the stem with sufficient strength that it will not fracture under ordinary handling or foundry operations of molding and pouring but after being sintered during the casting operation, is weak enough to be dissolved or to break up and allow the separation of the refractory particles as the result of manual or mechanical movement between the stem and disk, whereby the separated refractory particles can fall out of the clearance space 22 (Figure 3) between the stem and disk. The liquid used to provide temporary fluidity to the mixture may be water, which will evaporate when the coating or the stem is baked to set the binder.

By way of example, suitable refractories are periclase (a mineral formed mostly of magnesium oxide); silica; alumina; zerconite; zirconium silicate; or ordinary clay. Suitable binders include fire clay; core vils; resin type binder; or ethyl silicote.

Figure 2:
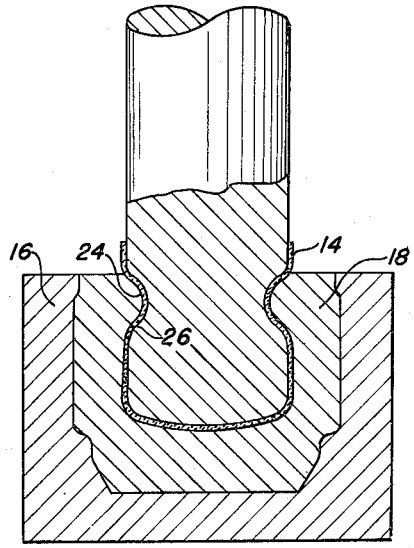
Figure 2 is a side elevation, partly in section, showing the arrangement of the elements during the molding process.

After a suitable slurry has been prepared the lower end of the stem, having the peripheral groove 12 is dipped into the slurry so that a coating 14 is formed over the stem. The coating should be of sufficient axial length to protrude above the disk 18 which is to be cast onto the stem, as shown in Figure 2.

The coated stem is then baked at a moderate temperature to set the coating 14. The thickness of this coating may be regulated by the number of dippings, so that any desired thickness may be obtained, and thus a definite clearance between the valve disk and stem results when the refractory is removed.

The coated stem is then set in a properly gated mold 16 and the molten melt for the valve disk 18 is poured.

When the valve disk 18 solidifies sufficiently the mold 16 is broken away. The overheated binder 14 between the valve disk 18 and the valve stem 16 looses its strength and crumples. This crumpling action may be assisted by working the valve disk 18 in a swiveling motion on the stem.

The fine refractory material when crumpled can be removed from the thus joined members through the aperture 20, leaving the desired clearance 22 between the valve disk and stem.

The swivel action is obtained by proper shaping of the end of the valve stem 10 so that clearance 22 is obtained to permit the disk to shift its axis while it is restrained on the stem by suitable interlocking means 24 and 26.

It will be seen however that any suitable contours may be formed on the valve stem in order to produce satisfactory interlocking means designed to restrain the valve disk thus making the disk an integral part of the assembly.

The cost of the assembly is less than the cost of one where the stem and disk are separately made and machined, and provided with conventional means which prevent their separation, but yet effect relative movement therebetween and enable the stem to force the disk or the like into engagement with the valve seat and to remove it therefrom. There is no possibility of separation of the stem and disk as sometimes happens with threaded or other machined connections.

It has previously been proposed to cover one article with a refractory material and to cast another part onto it so as to provide a clearance when the refractory is removed, as in the patent to Ware, No. 1,343,017. However, either a sharp cornered or a fibrous refractory was used, and it was very difficult to remove them after the casting operation, even though the relatively movable parts were both merely cylindrical. By means of my method the refractory is easily removable even though there are obstructions such as the groove 12, which would prevent the removal of fibrous or sharp cornered granular refractories.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The process of forming a joint having a predetermined clearance between a pair of coaxial elements so that they are relatively rotatable but fixedly interlocked against substantial relative axial movement, comprising forming a cylindrical end portion on a rod; forming a smoothly rounded peripheral groove of arcuate section on said cylindrical portion; placing a fluid coating of finely divided refractory material such as periclase and binder such as a fire clay of a thickness substantially equal to said predetermined clearance upon said end portion, said coating being capable of being rendered frangible under heat, each particle of said refractory material being devoid of sharp corners and substantially smaller than the predetermined clearance; heating the coating upon the rod to set the binder therein; placing said coated rod portion in a mold cavity; casting an element within said cavity and about said coated rod portion; after said element has hardened, moving said element with respect to said rod to fracture said coating; and removing said fractured coating from between said rod and element to form the desired predetermined clearance therebetween.

2. In the process of forming a ball and socket type connection with a predetermined clearance between the ball and socket elements, the steps of placing a fluid coating of finely divided refractory material such as periclase and a binder such as fire clay on the ball element over substantially its entire surface, said coating being capable of being rendered frangible under heat, each particle of said refractory material being devoid of sharp corners and of substantially less size than the predetermined clearance between the ball and socket; heating said coating to set said coating to a thickness corresponding to the predetermined clearance; placing the coated ball element in a mold cavity; casting the socket element in the cavity around the coated ball element; after said socket element has hardened relatively moving said elements to fracture said coating; and removing said fractured coating to form the predetermined clearance between the two elements over their entire mating surfaces.

References Cited in the file of this patent

UNITED STATES PATENTS

| Number | Name | Date |
|---|---|---|
| 224,541 | Jackman | Feb. 17, 1880 |
| 1,150,779 | Lord | Aug. 17, 1915 |
| 1,175,288 | Patrick | Mar. 14, 1916 |
| 1,225,887 | Swan | May 15, 1917 |
| 1,316,877 | Clarkson | Sept. 23, 1919 |
| 1,343,017 | Ware | June 8, 1920 |
| 1,541,216 | Hendricks | June 9, 1925 |
| 2,427,203 | Essig | Sept. 9, 1947 |
| 2,462,138 | Spangenberg | Feb. 22, 1949 |
| 2,476,728 | Heim | July 19, 1949 |

FOREIGN PATENTS

| Number | Country | Date |
|---|---|---|
| 459,157 | France | of 1913 |